(12) United States Patent
Ren et al.

(10) Patent No.: US 12,236,668 B2
(45) Date of Patent: Feb. 25, 2025

(54) EFFICIENTFORMER VISION TRANSFORMER

(71) Applicants: Jian Ren, Hermosa Beach, CA (US); Yang Wen, San Jose, CA (US); Ju Hu, Los Angeles, CA (US); Georgios Evangelidis, Vienna (AT); Sergey Tulyakov, Santa Monica, CA (US); Yanyu Li, Malden, MA (US); Geng Yuan, Medford, MA (US)

(72) Inventors: Jian Ren, Hermosa Beach, CA (US); Yang Wen, San Jose, CA (US); Ju Hu, Los Angeles, CA (US); Georgios Evangelidis, Vienna (AT); Sergey Tulyakov, Santa Monica, CA (US); Yanyu Li, Malden, MA (US); Geng Yuan, Medford, MA (US)

(73) Assignee: Snap Inc., Santa Monica, CA (US)

( * ) Notice: Subject to any disclaimer, the term of this patent is extended or adjusted under 35 U.S.C. 154(b) by 362 days.

(21) Appl. No.: 17/865,178

(22) Filed: Jul. 14, 2022

(65) Prior Publication Data

US 2024/0020948 A1 Jan. 18, 2024

(51) Int. Cl.
*G06K 9/00* (2022.01)
*G06V 10/44* (2022.01)
(Continued)

(52) U.S. Cl.
CPC ......... *G06V 10/764* (2022.01); *G06V 10/454* (2022.01); *G06V 10/82* (2022.01)

(58) Field of Classification Search
CPC ..... G06V 10/764; G06V 10/454; G06V 10/82
See application file for complete search history.

(56) References Cited

U.S. PATENT DOCUMENTS 11,887,270 B2 * 1/2024 Ke ..................... G06N 3/0464
2022/0012848 A1 * 1/2022 Ranftl ..................... G06N 3/04
(Continued)

OTHER PUBLICATIONS

AdaViT: Adaptive Vision Transformers for Efficient Image Recognition, Lingchen Meng et al., arXiv, 2021, pp. 1-12 (Year: 2021).*
Not All Patches Are What You Need: Expediting Vision Transformers via Token Reorganizations, Youwei Liang et al., arXiv, 2021, pp. 1-21 (Year: 2021).*
(Continued)

*Primary Examiner* — Jayesh A Patel
(74) *Attorney, Agent, or Firm* — CM Law; Stephen J. Weed (57) ABSTRACT

A vision transformer network having extremely low latency and usable on mobile devices, such as smart eyewear devices and other augmented reality (AR) and virtual reality (VR) devices. The transformer network processes an input image, and the network includes a convolution stem configured to patch embed the image. A first stack of stages including at least two stages of 4-Dimension (4D) metablocks (MBs) ($MB^{4D}$) follow the convolution stem. A second stack of stages including at least two stages of 3-Dimension MBs ($MB^{3D}$) follow the $MB^{4D}$ stages. Each of the $MB^{4D}$ stages and each of the $MB^{3D}$ stages include different layer configurations, and each of the $MB^{4D}$ stages and each of the $MB^{3D}$ stages include a token mixer. The $MB^{3D}$ stages each additionally include a multi-head self attention (MHSA) processing block.

15 Claims, 5 Drawing Sheets

(51) Int. Cl.
    *G06V 10/764*     (2022.01)
    *G06V 10/82*     (2022.01)

(56) References Cited

U.S. PATENT DOCUMENTS

| | | | | |
|---|---|---|---|---|
| 2022/0172066 | A1* | 6/2022 | Unterthiner | G06N 3/044 |
| 2022/0277218 | A1* | 9/2022 | Fan | G06N 3/08 |
| 2022/0375211 | A1* | 11/2022 | Tolstikhin | G06V 10/454 |
| 2022/0383630 | A1* | 12/2022 | Beyer | G06V 10/7747 |
| 2023/0106141 | A1* | 4/2023 | Kalantidis | G06F 18/211 |
| | | | | 706/15 |
| 2023/0401825 | A1* | 12/2023 | Akkaya | G06N 3/045 |

OTHER PUBLICATIONS

Refiner: Refining Self-attention for Vision Transformers, Daquan Zhou et al., arXiv, 2021, pp. 1-18 (Year: 2021).*
PSVIT: Better Vision Transformer via Token Pooling and Attention Sharing, Boyu Chen et al., arXiv, 2021, pp. 1-13 (Year: 2021).*
DeepViT: Towards Deeper Vision Transformer, Daquan Zhou et al., arXiv, 2021, pp. 1-12 (Year: 2021).*
How to train your ViT? Data, Augmentation, and Regularization in Vision Transformers, Andreas Steiner et al., arXiv, 2022, pp. 1-16 (Year: 2022).*
VOLO: Vision Outlooker for Visual Recognition, Li Yuan et al., arXiv, 2021, pp. 1-12 (Year: 2021).*
Multiscale Vision Transformers, Haoqi Fan et al., arXiv, 2021, pp. 1-18 (Year: 2021).*

* cited by examiner

EFFICIENTFORMER VISION TRANSFORMER

TECHNICAL FIELD

The present subject matter relates to vision transformers for processing images.

BACKGROUND

Vision Transformers (ViT) have shown rapid progress in computer vision tasks, achieving promising results on various benchmarks. However, due to the massive number of parameters and model design associated with ViT, ViT-based models are generally slower than lightweight convolutional networks in performing computer vision tasks, and, thus, are not suitable for mobile networks.

BRIEF DESCRIPTION OF THE DRAWINGS

The drawing figures depict one or more implementations, by way of example only, not by way of limitations. In the figures, like reference numerals refer to the same or similar elements.

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Vision transformer networks having low latency for use on mobile devices, such as smart eyewear devices and other augmented reality (AR) and virtual reality (VR) devices, are described. The vision transformer networks process images, e.g., for image classification, segmentation, and detection. The vision transformer network includes a convolution stem that patch embeds the image. A first stack of stages including at least two stages of 4-Dimension (4D) metablocks (MBs) ($MB^{4D}$) process the patch embedded image. A second stack of stages including at least two stages of 3-Dimension MBs ($MB^{3D}$) process the processed image from first stack of stages. Each of the $MB^{4D}$ stages and each of the $MB^{3D}$ stages include different layer configurations, and each of the $MB^{4D}$ stages and each of the $MB^{3D}$ stages include a token mixer. The $MB^{3D}$ stages each additionally include a multi-head self attention (MHSA) block.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Vision Transformers (ViT) have shown rapid progress in computer vision tasks, achieving promising results on various benchmarks. ViT may be used to perform image classification, segmentation, and detection. However, due to the massive number of parameters and model design, e.g., attention mechanism, conventional ViT-based models are generally much slower than lightweight convolutional networks. Therefore, the deployment of ViT for real-time applications is particularly challenging, especially on resource-constrained hardware such as mobile devices. Recent efforts have tried to reduce the computation complexity of ViT through network architecture search or hybrid design with MobileNet block, yet the inference speed is still unsatisfactory. Herein a new dimension-consistent pure vision transformer (without MobileNet blocks) is described.

Latency-driven slimming is performed to obtain a series of final models dubbed an EfficientFormer network. Extensive experiments show the superiority of the EfficientFormer network in performance and speed on mobile devices. One model, EfficientFormer-L1, achieves 79:2% top-1 accuracy on ImageNet-1K with only 1:6 ms inference latency on iPhone 12® with an A14 Bionic processor (available from Apple Inc. of Cupertino, California) (compiled with CoreML), which is even a bit faster than MobileNetV2 (1:7 ms, 71:8% top-1). A larger model, EfficientFormer-L7, having additional stages, obtains 83:3% accuracy with only 7:0 ms latency. Thus, properly designed transformers can reach extremely low latency on mobile devices while maintaining high performance.

The transformer architecture includes a Multi-Head Self Attention (MHSA) mechanism that allows the network to model long-term dependencies and is easy to parallelize. An attention mechanism to 2D images can be adopted with a ViT, where the input image is divided into non-overlapping patches, and the inter-patch representations are learned through MHSA without inductive bias.

Figure 1:
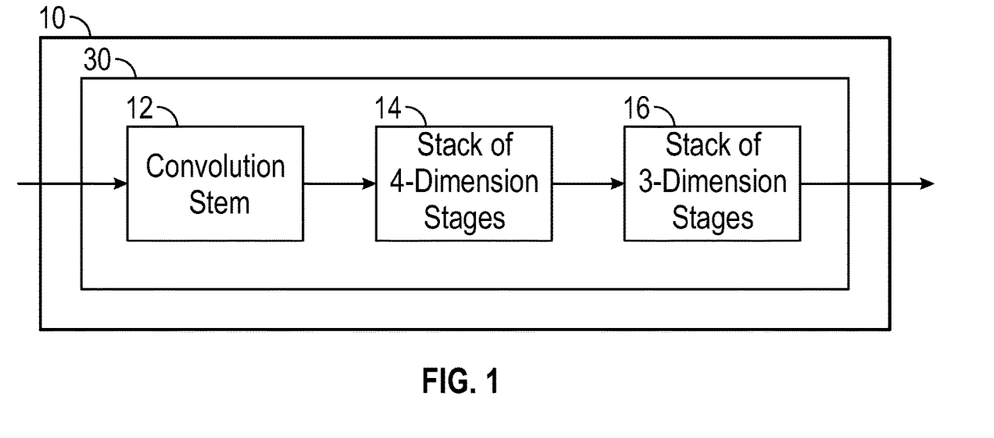
FIG. 1 is a block diagram of an image processor configured to implement the EfficientFormer network.
Figure 3A:
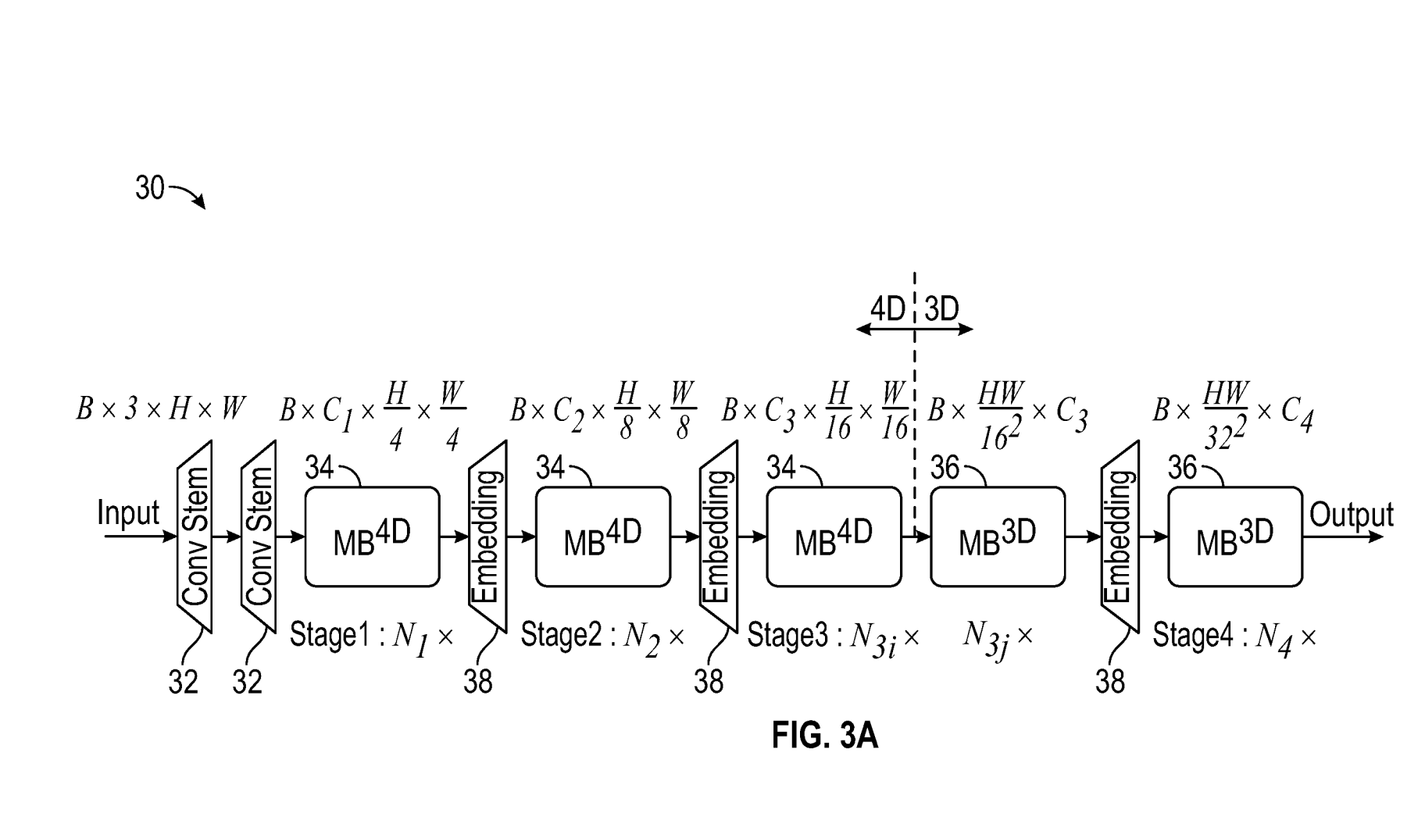
FIG. 3A is an electrical block diagram of an example EfficientFormer network of FIG. 1.
Figure 3B:
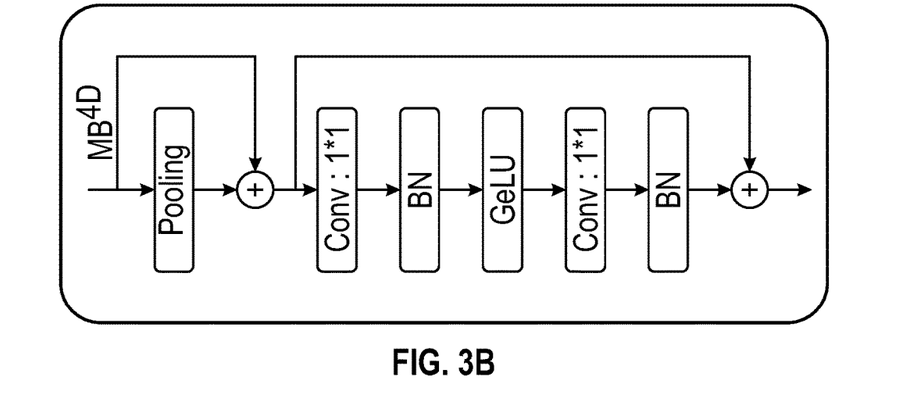
FIG. 3B is an electrical block diagram of a 4-dimension metablock.
Figure 3C:
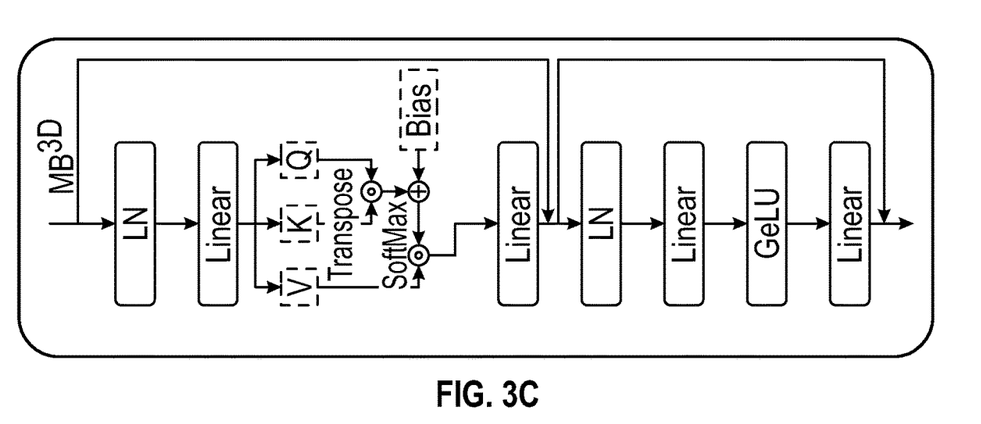
FIG. 3C is an electrical block diagram of a 3-dimension metablock.

FIG. 1 depicts an EfficientFormer network 30 that is configured to be processed by an image processor 10, which is further described below with reference to an example shown in FIGS. 3A-3C. The image processor 10 includes a convolution stem 12, a first stack 14 of 4-Dimension (4D) MetaBlocks (MB$^{4D}$) 34 (FIG. 3A), and a second stack 16 of 3-Dimension MetaBlocks (MB$^{3D}$) 36 (FIG. 3A). The convolution stem 12 includes a patch embedder that embeds an input image of shape (height, width, channels) into a feature vector of shape (n+1, d). Each MB$^{4D}$ Stage 34 (FIG. 3B), and each MB$^{3D}$ Stage 36 (FIG. 3C), include different layer configurations with a token mixer, i.e., pooling and multi-head self-attention (MHSA), arranged in a dimension-consistent manner. The EfficientFormer network 30 includes a dimension consistent design that splits the network into a 4D partition where operators are implemented in CONV-net style (MB$^{4D}$), and a 3D partition where linear projections and attentions are performed over a 3D tensor to enjoy the global modeling power of MHSA without sacrificing efficiency (MB$^{3D}$), as shown in FIG. 3A. Specifically, the EfficientFormer network 30 starts with a 4D partition, while a 3D partition is applied in later stages.

Figure 2:
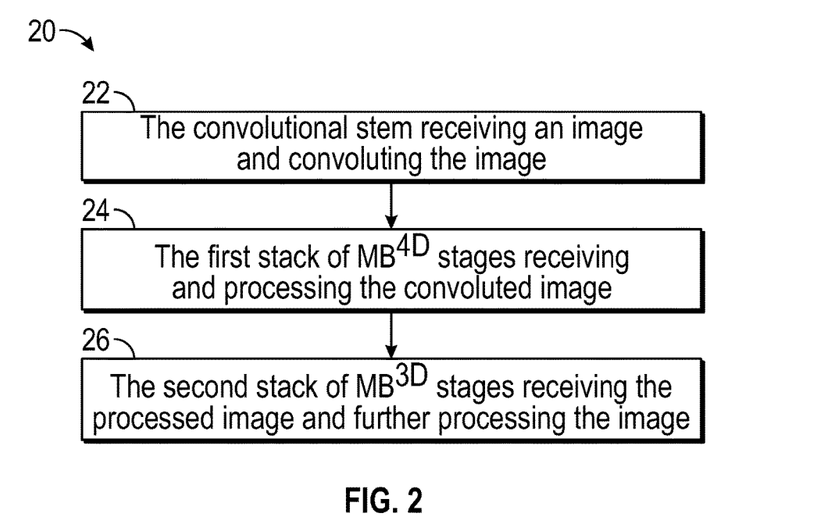
FIG. 2 is a flow chart of method steps for implementing the EfficientFormer network.

FIG. 2 is a flow diagram of a method 20 implemented by the image processor 10 operating the EfficientFormer network 30 shown in FIG. 3A. At step 22, the convolutional stem 12 receives an image and convolutes the image. Input images are processed by the convolution stem 12 with two 3×3 convolutions with stride 2 as patch embedding. Patch embedding is performed using patch embedder 38 between each stack of MBs to project embedding dimension and downsample token length, as shown in FIG. 3A. The EfficientFormer network 30 is a fully transformer-based model without integrating MobileNet structures. In one example, the convolution stem 12 shown in FIG. 3A of the EfficientFormer network 30 starts with the convolution stem 12 performing patch embedding on the received image. The patch embedder embeds an input image of shape (height, width, channels) into a feature vector of shape (n+1, d). Convolution is the process of transforming an image by applying a kernel over each pixel and its local neighbors across the entire image. The kernel is a matrix of values whose size and values determine the transformation effect of the convolution process. Patch embedding takes local image patches as input and performs dimension reduction to get low-dimensional patch embeddings via a deep encoder structure.

At step 24, the first stack 14 of MB$^{4D}$ stages 34 receive and process the convoluted image from the convolutional stem 12. The MB$^{4D}$ stages 34 each have different layer configurations with a token mixer, i.e., pooling and MHSA, arranged in a dimension-consistent manner. Each MB$^{4D}$ stage includes a simple Pool mixer to extract low level features. Group or Layer Normalization (LN) is not employed before the Pool mixer, since the 4D partition is a convolution batch normalization (CONV-BN) based design, thus, there exists a BN in front of each Pool mixer. There is a batch norm in the 4D partition so other normalization such as group norm or layer norm does not need to be used.

At step 26, after processing all the MB$^{4D}$ blocks, a one-time reshaping is performed to transform the features size and enter 3D partition. The second stack 16 of MB$^{3D}$ stages 36 receive and process the processed image from the first stack 14 of MB$^{4D}$ stages 34. Each MB$^{3D}$ stage follows conventional ViT structure. The MB$^{3D}$ stages 36 each include different layer configurations with the token mixer, i.e., pooling and MHSA, arranged in a dimension-consistent manner. The 4D partition works on 4D tensors while the 3D partition works on 3D tensors.

In one example, the convolution stem 12 is followed by the stack 14 of at least two (2) Stages of 4-Dimension (4D) MetaBlocks (MB$^{4D}$) 34 (shown as 3 stages), and then followed by the stack 16 of at least two (2) Stages of 3-Dimension MetaBlocks (MB$^{3D}$) 36. Each MB$^{4D}$ Stage 34, shown in FIG. 3B, and each MB$^{3D}$ Stage 36, shown in FIG. 3C, include different layer configurations with the token mixer, i.e., pooling and MHSA, arranged in a dimension-consistent manner. The EfficientFormer network 30 includes a patch embedder 38 (PatchEmbed) between each stack of MBs:

$$\mathcal{Y} = \Pi_i^m MB_i(\text{PatchEmbed}(\chi_0^{B,3,H,W})) \quad (1)$$

where $\chi_0$ is the input image with batch size as B and spatial size as [H, W], $\mathcal{Y}$ is the desired output, and m is the total number of blocks (depth). MB consists of unspecified token mixer (TokenMixer) followed by a MLP block and can be expressed as follows:

$$\chi_{i+1} = MB_i(\chi_i) = MLP(\text{TokenMixer}(\chi_i)), \quad (2)$$

where $\chi_{i|i>0}$ is the intermediate feature that is forwarded into the $i^{th}$ MB. Stage (or S) is defined as the stack of several MetaBlocks that processes the features with the same spatial size, such as $N_1 \times$ in FIG. 3A denoting $S_1$ has $N_1$ MetaBlocks. The EfficientFormer network 30 includes at least four (4) Stages, and is shown with five (5) Stages in FIG. 3A. Among each Stage, there is an embedding operation to project embedding dimension and downsample token length, denoted as Embedding in FIG. 3A. With this architecture, the EfficientFormer network 30 is a fully transformer-based model without integrating MobileNet structures. The following description includes the details of the EfficientFormer network 30 design, specifically, the architecture details and the search algorithm.

Dimension-consistent design. The EfficientFormer network 30 includes a dimension consistent design which splits the network into a 4D partition where operators are implemented in CONV-net style ($MB^{4D}$), and a 3D partition where linear projections and attentions are performed over 3D tensor to enjoy the global modeling power of MHSA without sacrificing efficiency ($MB^{3D}$), as shown in FIG. 3A. Specifically, the EfficientFormer network 30 starts with a 4D partition, while a 3D partition is applied in the last stages. FIG. 3A shows one example of the EfficientFormer network 30, as the actual length of 4D and 3D partition is specified later through architecture search.

First, input images are processed by convolution stem 32 with two 3×3 convolutions with stride 2 as patch embedding, $$\chi_1^{B,C_j|j=1,\frac{H}{4},\frac{W}{4}} = \text{Patch Embed}(\chi_0^{B,3,H,W}), \quad (3)$$

where $C_j$ is the channel number (width) of the j th stage. Then, the EfficientFormer network 30 starts with $MB^{4D}$ with a simple Pool mixer to extract low level features, $$\mathcal{I}_i = \text{Pool}\left(\chi_i^{B,C_j,\frac{H}{2^{j+1}},\frac{W}{2^{j+1}}}\right) + \chi_i^{B,C_j,\frac{H}{2^{j+1}},\frac{W}{2^{j+1}}}, \quad (4)$$

$$\chi_{i+1}^{B,C_j,\frac{H}{2^{j+1}},\frac{W}{2^{j+1}}} = \text{Conv}_B(\text{Conv}_{B,G}(\mathcal{I}_i)) + \mathcal{I}_i,$$

where $\text{Conv}_{B,G}$ refers to whether the convolution is followed by batch normalization (BN) and Gaussian Error Linear Unit (GeLU), respectively. Group or Layer Normalization (LN) is not employed before the Pool mixer, since the 4D partition is CONV-BN based design, thus, there exists a BN in front of each Pool mixer.

After processing all the $MB^{4D}$ blocks, a one-time reshaping is performed to transform the features size and enter 3D partition. $MB^{3D}$ follows conventional ViT structure, as in FIG. 3A. Formally, $$\mathcal{I}_i = \text{Linear}\left(MHSA\left(\text{Linear}\left(LN\left(\chi_i^{B,\frac{HW}{4^{j+1}},C_j}\right)\right)\right)\right) + \chi_i^{B,\frac{HW}{4^{j+1}},C_j}, \quad (5)$$

$$\chi_{i+1}^{B,\frac{HW}{4^{j+1}},C_j} = \text{Linear}(\text{Linear}_G(LN(\mathcal{I}_i))) + \mathcal{I}_i,$$

where $\text{Linear}_G$ denotes the Linear followed by GeLU, and $$MHSA(Q, K, V) = \text{Softmax}\left(\frac{Q \cdot K^T}{\sqrt{C_j}} + b\right) \cdot V, \quad (6)$$

where Q, K, V represents query, key, and values learned by the linear projection, and b is parameterized attention bias as position encodings.

Latency Driven Slimming. Based on the dimension-consistent design, a supernet is built for searching efficient models of the network architecture shown in FIG. 3A, where FIG. 3A shows an example of a searched final network. In order to represent such a supernet, the MetaPath (MP) is defined, which is the collection of possible blocks:

$$MP_{i,j=1,2} \in \{MB_i^{4D}, I_i\},$$

$$MP_{i,j=3,4} \in \{MB_i^{4D}, MB_i^{3D}, I_i\} \quad (7)$$

where I represents identity path, j denotes the $j^{th}$ Stage, and i denotes the $i^{th}$ block. The supernet can be illustrated by replacing MB in FIG. 3A with MP.

As in Eqn. 7, in $S_1$ and $S_2$ of the supernet, each block can select from $MB^{4D}$ or I, while in $S_3$ and $S_4$, the block can be $MB^{3D}$, $MB^{4D}$, or I. $MB^{3D}$ is enabled in the last two Stages for two reasons. First, since the computation of MHSA grows quadratically with respect to token length, integrating it in early Stages would largely increase the computation cost. Second, applying the global MHSA to the last Stages aligns with the intuition that early stages in the networks capture low-level features, while late layers learn long-term dependencies.

Searching Space. The searching space includes $C_1$ (the width of each Stage), $N_j$ (the number of blocks in each Stage, i.e., depth), and last N blocks to apply $MB^{3D}$.

Searching Algorithm. Previous hardware-aware network searching methods generally rely on hardware deployment of each candidate in search space to obtain the latency, which is time consuming. Herein, a simple, fast yet effective gradient-based search algorithm is used to obtain a candidate network that trains the supernet once. The algorithm has three major steps.

First, the supernet is trained with Gumble Softmax sampling to get the importance score for the blocks within each MP, which can be expressed as $$\chi_{i+1} = \sum_n \frac{e^{(\alpha_i^n + \epsilon_i^n)/\tau}}{\sum_n e^{(\alpha_i^n + \epsilon_i^n)/\tau}} \cdot MP_{i,j}(\chi_i), \quad (8)$$

where α evaluates the importance of each block in MP as it represents the probability to select a block, e.g., $MB^{4D}$ or $MB^{3D}$ for the $i^{th}$ block. $\epsilon \sim U(0,1)$ ensures exploration, r is the temperature, and n represents the type of blocks in MP, i.e., $n \in \{4D, I\}$ for $S_1$ and $S_2$, and $n \in \{4D, 3D, I\}$ for $S_3$ and $S_4$. By using Eqn. 8, the derivatives with respect to network weights and a can be computed easily. The training follows the standard recipe as further described hereafter to obtain the trained weights and architecture parameter a.

Second, a latency lookup table is built by collecting the on-device latency of $MB^{4D}$ and $MB^{3D}$ with different widths (multiples of 16).

Finally, network slimming is performed on the supernet obtained from the first step through latency evaluation using the lookup table. Note that a typical gradient-based searching algorithm simply selects the block with largest a, which does not fit this scope as it cannot search the width $C_j$. Constructing a multiple-width supernet is memory-consuming and even unrealistic given that each MP has several branches in this design. Instead of directly searching on the complex searching space, a gradual slimming is performed on the single-width supernet as follows.

An importance score is defined for $MP_i$ as $$\frac{\alpha_i^{4D}}{\alpha_i^I} \text{ and } \frac{\alpha_i^{3D} + \alpha_i^{4D}}{\alpha_i^I}$$

for $S_{1,2}$ and $S_{3,4}$, respectively.

Similarly, the importance score for each Stage is obtained by summing up the scores for all MP within the Stage. With the importance score, the action space is defined that includes three options: 1) select I for the least import MP, 2) remove the first $MB^{3D}$, and 3) reduce the width of the least important Stage (by multiples of 16). Then, the resulting latency is calculated for each action through a lookup table, and the accuracy drop of each action is evaluated. Lastly, the action is chosen based on per-latency accuracy drop $$\left(\frac{-\%}{ms}\right).$$

This process is performed iteratively until target latency is achieved.

Figure 5:
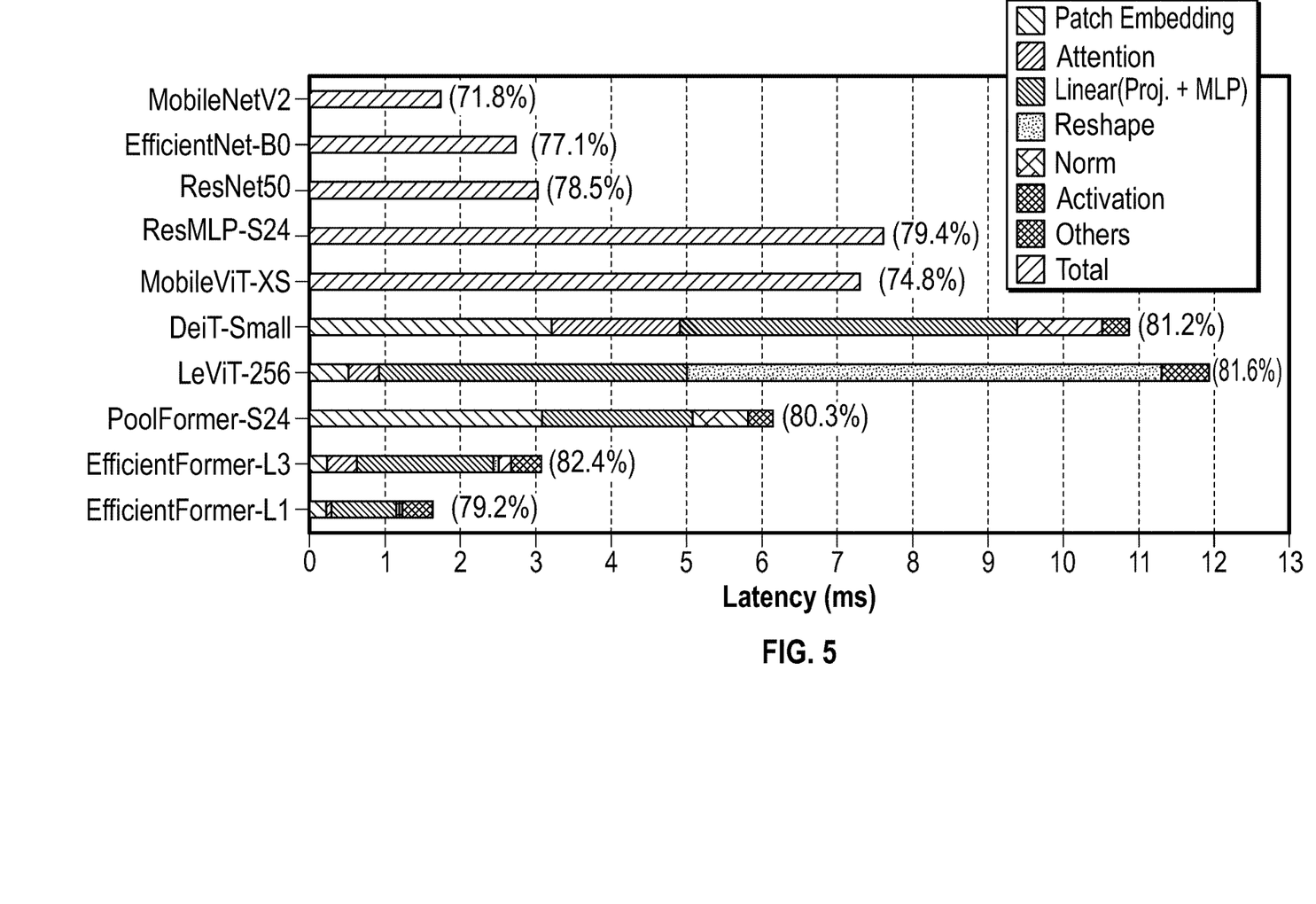
FIG. 5 is a graph showing latency profiling for the different network designs of FIG. 1.

Most existing approaches optimize the inference speed of transformers through computation complexity (MACs) or throughput (images/sec) obtained from server graphic processor unit (GPU). Such metrics do not reflect the real on-device latency. To have a clear understanding of which operations and design choices slow down the inference of conventional ViTs on edge devices, comprehensive latency analysis is performed over a number of models and operations, as shown in FIG. 5, whereby it is seen that patch embedding with large kernel and stride is a speed bottleneck on mobile devices.

Patch embedding is often implemented with a non-overlapping convolution layer that has a large kernel size and stride. A common belief is that the computation cost of the patch embedding layer in a transformer network is unremarkable or negligible. However, in the comparison shown in FIG. 5 between models with large kernel and stride for patch embedding, i.e., DeiT-S and PoolFormer-s24, and the models without it, i.e., LeViT-256 and EfficientFormer, shows that patch embedding is instead a speed bottleneck on mobile devices. Results are obtained on iPhone 12 with CoreML. The on-device speed for CNN (MobileNetV2, ResNet50, and EfficientNet), ViT-based models (DeiT-S, LeViT-256, PoolFormer-s24, and EfficientFormer), and various operators are reported. The latency of models and operations are denoted with different color. LeViT† uses HardSwish which is not well supported by CoreML, and it is replaced with GeLU for fair comparison.

Large-kernel convolutions are not well supported by most compilers and cannot be accelerated through existing algorithms like Winograd. Alternatively, the non-overlapping patch embedder can be replaced by a convolution stem with fast downsampling that consists of several hardware-efficient 3×3 convolutions as shown in FIG. 3A.

It is seen that consistent feature dimension is important for the choice of token mixer. MHSA is not necessarily a speed bottleneck.

Recent work extends ViT-based models to the MetaFormer architecture consisting of multi-layer perceptron (MLP) blocks and unspecified token mixers. Selecting a token mixer is an important design choice when building ViT-based models. The options are many—the conventional MHSA mixer with a global receptive field, more sophisticated shifted window attention, or a non-parametric operator like pooling.

In comparison to the two token mixers, pooling and MHSA, MHSA is chosen for its simplicity and efficiency, while pooling is chosen for better performance. More complicated token mixers like shifted window are currently not supported by most public mobile compilers and are left outside this scope. Depth-wise convolution is not used to replace pooling as the comparison is focused on building architecture without the aid of lightweight convolutions.

To understand the latency of the two token mixers, the following two comparisons are performed.

First, by comparing PoolFormer-s24 and LeViT-256, it is seen that the Reshape operation is a bottleneck for LeViT-256. The majority of LeViT-256 is implemented with CONV on 4D tensor, requiring frequent reshaping operations when forwarding features into MHSA since the attention has to be performed on patchified 3D tensor (discarding the extra dimension of attention heads). The extensive usage of Reshape limits the speed of LeViT on mobile devices, as shown in FIG. 5. However, pooling naturally suits the 4D tensor when the network primarily consists of CONV-based implementations, e.g., CONV 1×1 as MLP implementation and CONV stem for downsampling. As a result, PoolFormer exhibits faster inference speed.

Second, by comparing DeiT-S and LeViT-256, it is seen that MHSA does not bring significant overhead on mobiles if the feature dimensions are consistent and the Reshape operation is not required. Though much more computation intensive, DeiT-S with a consistent 3D feature can achieve comparable speed to the new ViT variant, i.e., LeViT-256.

It can be seen that consistent feature dimension is important for the choice of token mixer. MHSA is not necessarily a speed bottleneck.

Herein, a dimension-consistent network is used with both 4D feature implementation and 3D MHSA, but the inefficient frequent Reshape operations are eliminated. This disclosure recognizes CONV-BN is more latency-favorable than LN-Linear and the accuracy drawback is generally acceptable.

Choosing the MLP implementation is another design choice. Usually, one of the two options is selected: layer normalization (LN) with 3D linear projection and CONV 1×1 with batch normalization (BN). CONV-BN is more latency favorable because BN can be folded into the preceding convolution for inference speedup, while LN still collects running statistics at the inference phase, thus contributing to latency. Based on experimental results, the latency introduced by LN constitutes around 10%-20% latency of the whole network.

Based on an ablation study, CONV-BN only slightly downgrades performance compared to LN. In this disclosure, CONV-BN is applied as much as possible (in all latent 4D features) for the latency gain with a negligible performance drop, while using LN for the 3D features, which aligns with the original MHSA design in ViT and yields better accuracy.

It is observed that the latency of nonlinearity is hardware and compiler dependent. Nonlinearity should be determined on a case-by-case basis given specific hardware and compiler at hand. In this disclosure, GeLU activations are employed.

Experiments and Discussion. Table 1 provides a comparison of results on ImgeNet-1K. Hybrid refers to a mixture of MobileNet blocks and ViT blocks. (−) refers to unrevealed data or unsupported model in CoreML. Latency measured with GeLU activation, an original LeViT-256 model with HardSwish activations runs at 44.5 ms. Different training seeds lead to less than ±0.2% fluctuation in accuracy, and the error for latency benchmark is less than ±0.05 ms.

TABLE 1

| Model | Type | Params(M) | GMACs | Train. Epoch | Top-1(%) | Latency (ms) |
|---|---|---|---|---|---|---|
| MobileNetV2 × 1.0 | CONV | 3.5 | 0.3 | 300 | 71.8 | 1.3 |
| MobileNetV2 × 1.4 | CONV | 6.1 | 0.6 | 300 | 74.7 | 1.6 |
| ResNet50 | CONV | 25.5 | 4.1 | 300 | 78.5 | 3.0 |
| EfficientNet-B0 | CONV | 5.3 | 0.4 | 350 | 77.1 | 2.7 |
| EfficientNet-B3 | CONV | 12.0 | 1.8 | 350 | 81.6 | 6.6 |
| EfficientNet-B5 | CONV | 30.0 | 9.9 | 350 | 83.6 | 23.0 |
| DeiT-T | Attention | 5.9 | 1.2 | 300/1000 | 74.5/76.6 | 9.2 |
| DeiT-S | Attention | 22.5 | 4.5 | 300/1000 | 81.2/82.6 | 11.8 |
| PVT-Small | Attention | 24.5 | 3.8 | 300 | 79.8 | 24.4 |
| T2T-ViT-14 | Attention | 21.5 | 4.8 | 310 | 81.5 | — |
| Swin-Tiny | Attention | 29 | 4.5 | 300 | 81.3 | — |
| PoolFormer-s12 | Pool | 12 | 2.0 | 300 | 77.2 | 6.1 |
| PoolFormer-s24 | Pool | 21 | 3.6 | 300 | 80.3 | 6.2 |
| PoolFormer-s36 | Pool | 31 | 5.2 | 300 | 81.4 | 6.7 |
| ResMLP-S24 | SMLP | 30 | 6.0 | 300 | 79.4 | 7.6 |
| Convmixer-768 | Hybrid | 21.1 | 20.7 | 300 | 80.2 | 11.6 |
| LeViT-256 | Hybrid | 18.9 | 1.1 | 1000 | 81.6 | 11.9 |
| NASVIT-A5 | Hybrid | — | 0.76 | 360 | 81.8 | — |
| MobileViT-XS | Hybrid | 2.3 | 0.7 | 300 | 74.8 | 7.2 |
| EfficientFormer-L1 | MetaBlock | 12.2 | 1.2 | 300 | 79.2 | 1.6 |
| EfficientFormer-L3 | MetaBlock | 31.3 | 3.4 | 300 | 82.4 | 3.0 |
| EfficientFormer-L7 | MetaBlock | 82.0 | 7.9 | 300 | 83.3 | 7.0 |

The EfficientFormer network 30 is implemented through PyTorch 1.11 and Timm library, which is the common practice in recent arts. These models are trained on a cluster with NVIDIA A100 and V100 GPUs. The mobile speed is averaged over 1,000 runs on iPhone 12 equipped with an A14 bionic chip, with all available computing resources (NPU). CoreMLTools is used to deploy the run-time model.

Figure 4:
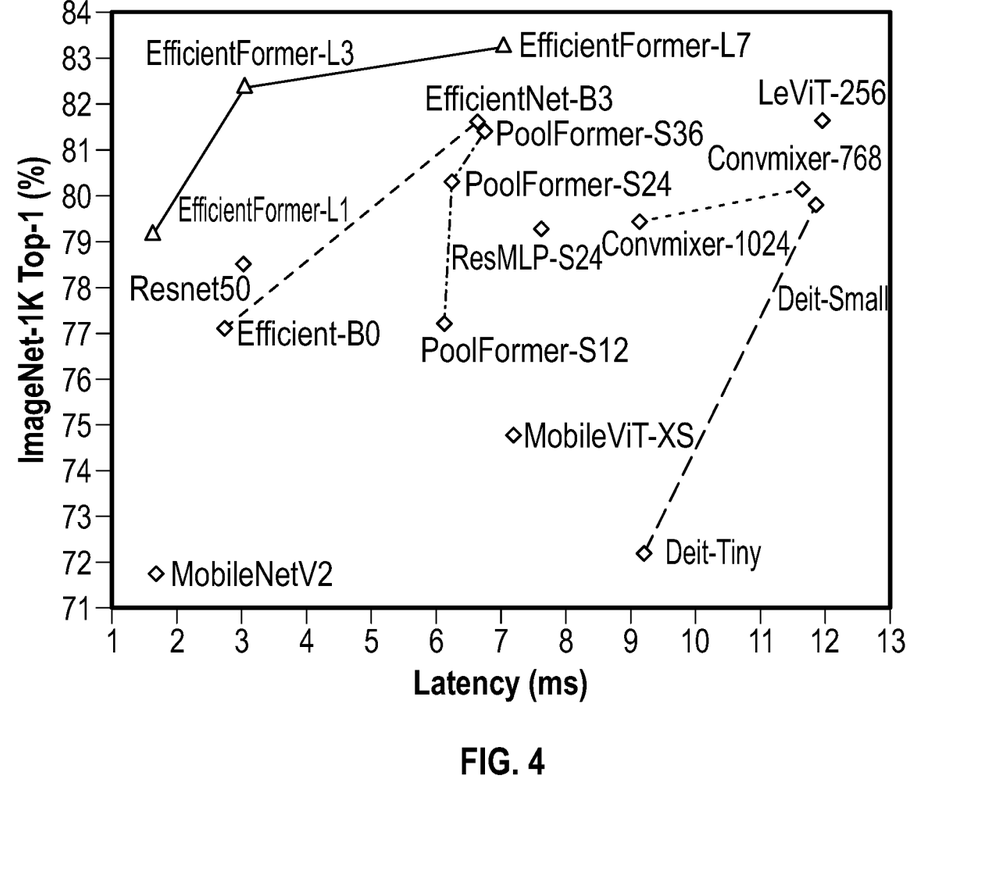
FIG. 4 is a graph showing inference speed vs. accuracy in a transformer network for different network designs.

Image Classification. All EfficientFormer network 30 models are trained from scratch on ImageNet-1K dataset to perform the image classification task. A standard image size (224×224) is employed for both training and testing. The training recipe is followed from DeiT but mainly report results with 300 training epochs to have the comparison with other ViT-based models. In this example, an AdamW optimizer is used, warm-up training with 5 epochs, and a cosine annealing learning rate schedule. The initial learning rate is set as $10^{-3}$×(batch size/1024) and the minimum learning rate is $10^{-5}$. The teacher model for distillation is RegNetY-16GF pretrained on ImageNet with 82.9% top-1 accuracy. Results are demonstrated in Table 1 and FIG. 4

Comparison to CNNs. Compared with the widely used CNN-based models, the EfficientFormer network 30 achieves a better trade-off between accuracy and latency. For example, the EfficientFormer-L1 runs at MobileNetV2×1.4 speed while achieving 4.5% higher top-1 accuracy. In addition, EfficientFormer-L3 runs at a similar speed to EfficientNet-B0 while achieving relative 5.3% higher top-1 accuracy. For the models with high performance (>83% top-1), EfficientFormer-L7 runs more than 3× faster than EfficientNet-B5, demonstrating the advantageous performance of these models. These results show that ViTs do not need to sacrifice latency to achieve good performance, and an accurate ViT can still have ultra-fast inference speed as lightweight CNNs do.

Comparison to ViTs. Conventional ViTs are still underperforming CNNs in terms of latency. For instance, DeiT-Tiny achieves similar accuracy to EfficientNet-B0 while it runs 3.4× slower. However, the EfficientFormer network 30 performs like other transformer models while running much faster. For instance, EfficientFormer-L3 achieves higher accuracy than DeiT-Small (82.4% vs. 81.2%) while being 4× faster. It is notable that though the recent transformer variant, PoolFormer, naturally has a consistent 4D architecture and runs faster compared to typical ViTs, the absence of global MHSA greatly limits the performance upper-bound. With 123% higher inference latency, PoolFormer-S36 still underperforms EfficientFormer-L3 by 1% top-1 accuracy.

Comparison to Hybrid Designs. Existing hybrid designs, e.g., LeViT-256 and MobileViT, still struggle with the latency bottleneck of ViTs and can hardly outperform lightweight CNNs. For example, LeViT-256 runs slower than DeiT-Small while having 1% lower top-1 accuracy. For MobileViT, which is a hybrid model with both MHSA and MobileNet blocks, it is observed that it is significantly slower than CNN counterparts, e.g., MobileNetV2 and EfficientNet-B0, while the accuracy is not satisfactory either (2.3% lower than EfficientNet-B0). Thus, simply trading-off MHSA with MobileNet blocks can hardly push forward the Pareto curve, as in FIG. 4. In contrast, EfficientFormer network 30, as a pure transformer-based model, maintains high performance while achieving ultra-fast inference speed. At a similar inference time, EfficientFormer-L7 outperforms MobileViT-XS by 8.5% top-1 accuracy on ImageNet, demonstrating the superiority of this EfficientFormer network 30 design.

EfficientFormer as Backbone. Object Detection and Instance Segmentation. The Mask-RCNN implementation is followed to integrate the EfficientFormer network 30 as the backbone and verify performance. The EfficientFormer network 30 is experimented over COCO-2017 which contains training and validations sets of 118K and 5K images, respectively. The EfficientFormer network 30 backbone is initialized with ImageNet-1K pretrained weights. The AdamW optimizer is used with initial learning rate of $1\times10^{4}$, and the model is trained for 12 epochs. An input size as 1333×800 is set-up.

The results for detection and instance segmentation are shown in Table 2. Results on object detection & instance segmentation are obtained from COCO 2017. Results on semantic segmentation are obtained from ADE20K.

TABLE 2

| Backbone | Detection & Instance Segmentation | | | | | | Semantic |
| --- | --- | --- | --- | --- | --- | --- | --- |
|  | $AP^{box}$ | $AP_{50}^{box}$ | $AP_{75}^{box}$ | $AP^{mask}$ | $Ap_{50}^{mask}$ | $Ap_{75}^{mask}$ | mIoU (%) |
| ResNet18 | 34.0 | 54.0 | 36.7 | 31.2 | 51.0 | 32.7 | 32.9 |
| PoolFormer-S12 | 37.3 | 59.0 | 40.1 | 34.6 | 55.8 | 36.9 | 37.2 |
| EfficientFormer-L1 | 37.9 | 60.3 | 41.0 | 35.4 | 57.3 | 37.3 | 38.9 |
| ResNet50 | 38.0 | 58.6 | 41.4 | 34.4 | 55.1 | 36.7 | 36.7 |
| PoolFormer-S24 | 40.1 | 62.2 | 43.4 | 37.0 | 59.1 | 39.6 | 40.3 |
| EfficientFormer-L3 | 41.4 | 63.9 | 44.7 | 38.1 | 61.0 | 40.4 | 43.5 |
| ResNet101 | 40.4 | 61.1 | 44.2 | 36.4 | 57.7 | 38.8 | 38.8 |
| PoolFormer-S36 | 41.0 | 63.1 | 44.8 | 37.7 | 60.1 | 40.0 | 42.0 |
| EfficientFormer-L7 | 42.6 | 65.1 | 46.1 | 39.0 | 62.2 | 41.7 | 45.1 |

The EfficientFormer network 30 consistently outperforms CNN (ResNet) and transformer (PoolFormer) backbones. With similar computation cost, EfficientFormer-L3 outperforms ResNet50 backbone by 3.4 box AP and 3.7 mask AP, and outperforms PoolFormer-S24 backbone with 1.3 box AP and 1.1 mask AP, proving that EfficientFormer network 30 generalizes well as a strong backbone in vision tasks.

Semantic Segmentation. The performance of EfficientFormer network 30 is validated on the semantic segmentation task. The challenging scene parsing dataset is used, ADE20K, which contains 20K training images and 2K validation ones covering 150 class categories. The EfficientFormer network 30 is built as a backbone along with Semantic FPN as segmentation decoder for fair comparison. The backbone is initialized with pretrained weights on ImageNet-1K and the model is trained for 40K iterations with a total batch size of 32 over 8 GPUs. The common practice in segmentation is followed, using the AdamW optimizer, and apply a poly learning rate schedule with power 0.9, starting from a initial learning rate $2 \times 10^4$. The input images are resized and cropped to 512×512 for training and shorter side as 512 for testing (on validation set).

As shown in Table 2, the EfficientFormer network 30 consistently outperforms CNN- and transformer-based backbones by a large margin under a similar computation budget. For example, EfficientFormer-L3 outperforms PoolFormer-S24 by 3.2 mIoU. With global attention, the EfficientFormer network 30 learns better long-term dependencies, which is beneficial in high-resolution dense prediction tasks.

The EfficientFormer network 30 addresses the dimension mismatch problem, which is a root cause of inefficient edge inference, thus being capable of utilizing global MHSA without sacrificing speed. Consequently, the EfficientFormer network 30 exhibits advantageous accuracy performance over PoolFormer. In spite of its fully 4D design, PoolFormer employs inefficient patch embedding and group normalization, as shown in FIG. 5, leading to increased latency. Instead, the redesigned 4D partition of the EfficientFormer network 30, as shown in FIG. 3A, is more hardware friendly and exhibits better performance across several tasks.

Though most designs of the EfficientFormer network 30 are general-purposed, e.g., dimension-consistent design and 4D block with CONV-BN fusion, the actual speed of EfficientFormer network 30 may vary on other platforms. For instance, if GeLU is not well supported while HardSwish is efficiently implemented on specific hardware and compiler, the operator may need to be modified accordingly. The latency-driven slimming is simple and fast. However, better results may be achieved if search cost is not a concern and an enumeration-based brute search is performed.

The EfficientFormer network 30 can operate at MobileNet speed on mobile devices. The EfficientFormer network 30 complies with a dimension consistent design that smoothly leverages hardware-friendly 4D MetaBlocks and powerful 3D MHSA blocks. The fast latency-driven slimming method derives optimized configurations based on the design space. Extensive experiments on image classification, object detection, and segmentation tasks show that EfficientFormer network 30 models outperform existing transformer models while being faster than most competitive CNNs.

The EfficientFormer network 30 may be used as an encoder (feature extractor) for tasks like object detection and dense (pixel-wise) prediction tasks like semantic segmentation and depth estimation. In these cases, the EfficientFormer network 30 is used as a backbone (encoder) to provide feature representations which are then fed to a network decoder that provides pixel-wise labels (predictions).

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A vision transformer, comprising:
a convolution stem configured to perform patch embedding on an image;
a first stack of stages including at least two stages of 4-Dimension metablocks (MBs) ($MB^{4D}$) configured to process the patch embedded image; and
a second stack of stages including at least two stages of 3-Dimension MBs ($MB^{3D}$) configured to process the processed image from the first stack of stages, wherein each of the $MB^{4D}$ stages and each of the $MB^{3D}$ stages include different layer configurations, wherein each of the $MB^{4D}$ stages and each of the $MB^{3D}$ stages include a token mixer, and wherein each of the $MB^{4D}$ stages and each of the $MB^{3D}$ stages include pooling and multi-head self-attention, arranged in a dimension-consistent manner.

2. The vision transformer of claim 1, wherein the second stack of stages are configured to classify the image.

3. The vision transformer of claim 1, further comprising a patch embedder between the $MB^{4D}$ stages, and comprising a patch embedder between the $MB^{3D}$ stages, wherein the patch embedders are configured to project an embedding dimension and a downsample token length.

4. A vision transformer, comprising:
a convolution stem configured to perform patch embedding on an image;
a first stack of stages including at least two stages of 4-Dimension metablocks (MBs) ($MB^{4D}$) configured to process the patch embedded image, and
a second stack of stages including at least two stages of 3-Dimension MBs (MB) configured to process the processed image from the first stack of stages,
wherein the vision transformer is defined by:

$$\mathcal{Y}=\Pi_i^m MB_i(\text{PatchEmbed}(\chi^{B,3,H,W})),$$

where $\chi_0$ is the image with a batch size B and a spatial size [H, W], where $\mathcal{Y}$ is a desired output, and m is a total number of MBs.

5. The vision transformer of claim 4, wherein each of the MBs include a token mixer followed by a multi-layer-perceptron (MLP) block expressed as:

$$\chi_{i+1}=MB_i(\chi_i)=MLP(\text{TokenMixer}(\chi_i))$$

where $\chi_{i|i>0}$ is an intermediate feature configured to be forwarded into an $i^{th}$ MB, wherein a first stage is configured to processes the feature with the same spatial size, and the second stage is configured to processes the feature with the same spatial size.

6. A vision transformer, comprising:
a convolution stem configured to perform patch embedding on an image;
a first stack of stages including at least two stages of 4-Dimension metablocks (MBs) ($MB^{4D}$) configured to process the patch embedded image; and
a second stack of stages including at least two stages of 3-Dimension MBs ($MB^{3D}$) configured to process the processed image from the first stack of stages, wherein the $MB^{3D}$ stages each comprise a multi-head self attention (MHSA) block.

7. A method of using a vision transformer, comprising:
receiving and convoluting an image using a convolution stem to patch embed the image;
receiving and processing the patch embedded image using a first stack of stages stages including at least two stages of 4-Dimension metablocks (MBs) ($MB^{4D}$); and
receiving the processed image from the first stack of stages and further processing the processed image using a second stack of stages including 3-Dimension MBs ($MB^{3D}$), wherein each of the $MB^{4D}$ stages and each of the $MB^{3D}$ stages include different layer configurations, wherein each of the $MB^{4D}$ stages and each of the $MB^{3D}$ stages include a token mixer, and wherein each of the $MB^{4D}$ stages and each of the $MB^{3D}$ stages include pooling and multi-head self-attention, arranged in a dimension-consistent manner.

8. The method of claim 7, wherein the second stack of stages classifies the image.

9. The method of claim 7, further comprising patch embedding between the $MB^{4D}$ stages, and patch embedding between the $MB^{3D}$ stages, wherein the patch embedding projects an embedding dimension and a downsample token length.

10. A method of using a vision transformer, comprising:
receiving and convoluting an image using a convolution stem to patch embed the image;
receiving and processing the patch embed de age using first stack of stages stages including at least two stages of 4-Dimension metablocks (MBs)($MB^{4D}$); and
receiving the processed image from the first stack of stages and further processing the processed image using a second stack of stages including 3-Dimension MBs ($MB^{3D}$), wherein the vision transformer is defined by:

$$\mathcal{Y}=\Pi_i^m MB_i(\text{PatchEmbed}(\chi^{B,3,H,W})),$$

where $\chi_0$ is the image with a batch size B and a spatial size [H, W], where $\mathcal{Y}$ is a desired output, and m is a total number of MBs.

11. The method of claim 10, wherein each of the MBs include a token mixer followed by a multi-layer-perceptron (MLP) block expressed as:

$$\chi_{i+1}=MB_i(\chi_i)=MLP(\text{TokenMixer}(\chi_i))$$

where $\chi_{i|i>0}$ is an intermediate feature configured to be forwarded into an $i^{th}$ MB, wherein the first stage is configured to processes the feature with the same spatial size, and the second stage is configured to processes the feature with the same spatial size.

12. A method of using a vision transformer comprising:
receiving and convoluting an image using a convolution stem to patch embed the image;
receiving and processing the patch embedded image using a first stack of stages stages including at least two stages of 4-Dimension metablocks (MBs)($MB^{4D}$); and
receiving the processed image from the first stack of stages and further processing the processed image using a second stack of stages including Dimension MBs($MB^{3D}$), wherein the $MB^{3D}$ stages each comprise a multi-head self attention (MHSA) block.

13. A non-transitory computer readable medium storing program code, which when executed, is operative to cause a processor of a vision transformer to perform the steps of:
  receiving and convoluting an image using a convolution stem to patch embed the image;
  receiving and processing the patch embedded image using a first stack of stages stages including at least two stages of 4-Dimension metablocks (MBs)(MB$^{4D}$); and
  receiving the processed image from the first stack of stages and further processing the processed image using a second stack of stages including 3-Dimension MBs (MB$^{3D}$),
  wherein each of the MB$^{4D}$ stages and each of the MB$^{3D}$ stages include different layer configurations, wherein each of the MB$^{4D}$ stages and each of the MB$^{3D}$ stages include a token mixer, and wherein each of the MB$^{4D}$ stages and each of the MB$^{3D}$ stages include pooling and multi-head self-attention, arranged in a dimension-consistent manner.

14. A non-transitory computer readable medium storing program code, which when executed, is operative to cause a processor of a vision transformer to perform the steps of:
  receiving and convoluting an image using a convolution stem to patch embed the image;
  receiving and processing the patch embedded image using a first stack of stages stages including at least two stages of 4-Dimension metablocks (MBs)(MB$^{4D}$); and
  receiving the processed image from the first stack of stages and further processing the processed image using a second stack of stages including 3-Dimension MBs (MB$^{3D}$), wherein the vision transformer is defined by:

$$\mathcal{Y} = \Pi_i^m MB_i(\text{PatchEmbed}(\chi_0^{B,3,H,W})),$$

where $\chi_0$ is the image with a batch size B and a spatial size [H, W], where $\mathcal{Y}$ is a desired output, and m is a total number of MBs.

15. A non-transitory computer readable medium storing program code, which when executed, is operative to cause a processor of a vision transformer to perform the steps of:
  receiving and convoluting an image using a convolution stem to patch embed the image;
  receiving and processing the patch embedded image using a first stack of stages stages including at least two stages of 4-Dimension metablocks (MBs) (MB$^{4D}$); and
  receiving the processed image from the first stack of stages and further processing the processed image using a second stack of stages including 3-Dimension MBs (MB$^{3D}$), wherein the MB$^{3D}$ stages each comprise a multi-head self attention (MHSA) block.

* * * * *